(12) United States Patent
Mishra (10) Patent No.: US 10,982,962 B2
(45) Date of Patent: Apr. 20, 2021

(54) V2X LOCATION ACCURACY ENHANCEMENT

(71) Applicant: FORD GLOBAL TECHNOLOGIES, LLC, Dearborn, MI (US)

(72) Inventor: Anjali Mishra, San Jose, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 124 days.

(21) Appl. No.: 16/133,018

(22) Filed: Sep. 17, 2018

(65) Prior Publication Data

US 2020/0088528 A1 Mar. 19, 2020

(51) Int. Cl.
| | |
|---|---|
| G01C 21/32 | (2006.01) |
| G06T 7/73 | (2017.01) |
| G06K 9/00 | (2006.01) |
| H04W 4/40 | (2018.01) |
| G01S 19/48 | (2010.01) |
| H04W 4/021 | (2018.01) |
| H04W 64/00 | (2009.01) |
| G06F 16/29 | (2019.01) |

(52) U.S. Cl.
CPC ............ *G01C 21/32* (2013.01); *G01S 19/48* (2013.01); *G06F 16/29* (2019.01); *G06K 9/00791* (2013.01); *G06T 7/74* (2017.01); *H04W 4/021* (2013.01); *H04W 4/40* (2018.02); *H04W 64/003* (2013.01); *G06T 2207/30244* (2013.01); *G06T 2207/30252* (2013.01)

(58) Field of Classification Search
CPC ...... G01C 21/32; G06F 16/29; H04W 64/003; H04W 4/021; H04W 4/40; G06K 9/00791; G01S 19/48; G06T 7/74; G06T 2207/30252; G06T 2207/30244
See application file for complete search history.

(56) References Cited

U.S. PATENT DOCUMENTS

| | | | | |
|---|---|---|---|---|
| 5,546,311 A | * | 8/1996 | Sekine | G08G 1/052 340/902 |
| 5,983,161 A | * | 11/1999 | Lemelson | G01S 19/11 701/301 |
| 6,370,475 B1 | * | 4/2002 | Breed | G01S 13/931 701/301 |
| 9,020,755 B1 | * | 4/2015 | Gazit | G01S 19/41 701/469 |
| 9,621,640 B2 | * | 4/2017 | Reber | G05B 19/4099 |
| 10,748,229 B2 | * | 8/2020 | Amento | G06Q 50/30 |
| 2008/0095134 A1 | * | 4/2008 | Chen | H04W 40/32 370/342 |
| 2008/0215231 A1 | * | 9/2008 | Breed | G08G 1/161 701/117 |
| 2012/0323690 A1 | * | 12/2012 | Michael | G01C 21/3461 705/14.58 |

(Continued)

*Primary Examiner* — Babar Sarwar
(74) *Attorney, Agent, or Firm* — Michael J. Spenner; Brooks Kushman P.C.

(57) ABSTRACT

A system includes a camera and a processor. The processor is programmed to determine a first location of the vehicle using wireless signals; responsive to determining that the first location is within an urban area, capture an image of a fixed-location device along a roadway using the camera; identify a device location of the fixed-location device; and update the first location in comparison with the device location to generate a second location of the vehicle.

19 Claims, 4 Drawing Sheets

(56) References Cited

U.S. PATENT DOCUMENTS

| | | | |
|---|---|---|---|
| 2015/0221219 A1* | 8/2015 | Engelbert | G08G 1/065 340/932.2 |
| 2016/0071172 A1* | 3/2016 | Shangguan | H04W 4/02 705/13 |
| 2016/0142492 A1* | 5/2016 | Fang | H04W 4/44 370/254 |
| 2017/0270787 A1* | 9/2017 | Menard | G08B 25/08 |
| 2017/0323227 A1* | 11/2017 | Sadeghi | G06Q 20/102 |
| 2017/0361835 A1* | 12/2017 | Tarte | G08G 1/147 |
| 2018/0023972 A1 | 1/2018 | Lei et al. | |
| 2018/0144637 A1 | 5/2018 | Ikedo et al. | |
| 2018/0302280 A1* | 10/2018 | Jiang | H04W 72/044 |
| 2018/0335525 A1* | 11/2018 | Niesen | G01S 19/45 |
| 2018/0372503 A1* | 12/2018 | Bagchi | G06N 20/00 |
| 2018/0374345 A1* | 12/2018 | Suzuki | G08G 1/0112 |
| 2019/0047574 A1* | 2/2019 | Nishi | G08G 1/096741 |
| 2019/0050634 A1* | 2/2019 | Nerayoff | G07B 15/00 |
| 2019/0080582 A1* | 3/2019 | Tanabe | G08B 21/24 |
| 2019/0172349 A1* | 6/2019 | Vora | G08G 1/096833 |
| 2019/0188901 A1* | 6/2019 | Herman | G06T 3/4038 |
| 2019/0202442 A1* | 7/2019 | Lavoie | H04B 17/318 |
| 2019/0208387 A1* | 7/2019 | Jiang | G01S 5/0205 |
| 2019/0271550 A1* | 9/2019 | Breed | G08G 1/147 |
| 2019/0324111 A1* | 10/2019 | Marshall | G01S 5/0036 |
| 2019/0333379 A1* | 10/2019 | Malkes | G06K 9/00825 |
| 2019/0347498 A1* | 11/2019 | Herman | G06T 7/11 |
| 2019/0378221 A1* | 12/2019 | Benkreira | G06Q 50/06 |
| 2020/0079308 A1* | 3/2020 | Vanterpool | B60R 22/28 |
| 2020/0250978 A1* | 8/2020 | Klochikhin | G08G 1/144 |

\* cited by examiner

V2X LOCATION ACCURACY ENHANCEMENT

TECHNICAL FIELD

Aspects of the disclosure generally relate to location accuracy enhancements in an urban environment by using vehicle-to-anything (V2X) communications.

BACKGROUND

In very high density urban areas or inside a building such as a parking garage, a vehicle equipped with a global navigation satellite system (GNSS) or assisted-GNSS may not be able to determine its location accurately. For example, a driver may pull out of a parking space in a parking garage and be unable to identify whether to turn left or right. However, when the driver looks to the vehicle navigation system for directions, the navigation system may receive insufficient GNSS signal to locate the vehicle with adequate precision and accuracy.

SUMMARY

In one or more illustrative examples, a vehicle includes a camera; and a processor programmed to determine a first location of the vehicle using wireless signals; responsive to determining that the first location is within an urban area, capture an image of a fixed-location device along a roadway using the camera; identify a device location of the fixed-location device; and update the first location in comparison with the device location to generate a second location of the vehicle.

In one or more illustrative examples, a method includes, responsive to a location of a vehicle determined using one or more of global navigation satellite system (GNSS) or cellular signals being identified as within an urban area, updating the location to generate a revised location of the vehicle by using predefined locations of parking meters identified in images captured by a camera of the vehicle.

In one or more illustrative examples, a non-transitory computer-readable medium includes instructions that, when executed by a processor of a controller of a vehicle, cause the vehicle to determine a first location of the vehicle using wireless signals from one or more of global navigation satellite system (GNSS) satellites or cellular base stations; responsive to determining that the first location is within an urban area, capture an image of a parking meter using a camera of the vehicle; identify a predefined fixed location of the parking meter included within the image; and update the first location using the location of the parking meter to generate a second location of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Location accuracy is a fundamental requirement of V2X technology. For instance, the U.S. National Highway and Transportation Safety Agency (NHTSA) specifies a vehicle accuracy requirement that the longitude and latitude position that vehicles report be within 1.5 meters of their actual position, which is approximately one half of a lane width.

This level of location accuracy may be achievable in open sky conditions where GNSS satellites are within line-of-sight. This level may also be achievable when the cellular base stations are within line-of-sight. However, in dense urban scenarios and busy city scenarios as well as heavy foliage scenarios, line-of-sight may not exist. Using GNSS satellite signal-based positioning, the positioning error may be several meters worse than NHTSA mandate of 1.5 meters in dense urban non-line-of-sight situations. Using cellular network signal-based positioning, the positioning error may be several meters worse than NHTSA mandate of 1.5 meters due to multipath effects and bouncing and bending of signals in dense urban non-line of-sight situations. When cellular network technology is combined with GNSS technology for positioning, the positioning error may still be several meters worse than NHTSA mandate of 1.5 meters in dense urban non-line of-sight situations. WiFi and cellular network technology-based positioning is also widely available which can be used for V2X communication technology positioning. However, these methodologies face again the same issue of non-line of sight location accuracy degradation resulting in severe degradation in dense urban scenarios. As another possibility, dead reckoning technology may be used, but the location and velocity error can be worse than these other methods when no external reference is used.

Current location technologies offer several meters of accuracy in dense urban scenarios. Thus, none of these V2X positioning options meets the NHTSA mandates for location accuracy of 1.5 meters in dense urban scenario. This sets up vehicles implementing V2X for possible violation of the NHTSA requirement, delay in deployment of V2X technology due to safety issues as well as poses a possibility of vehicle recall.

An improved vehicle location strategy may utilize vehicle cameras to capture pictures and videos of the vehicle's surroundings to make driving decisions. These cameras can take pictures of the roadside parking meters and scan the parking meters for their identities. As the vehicle traverses a route, these parking meters along the route may continue to be utilized to inform the location application of the location and distance of the vehicle from the parking meters. This additional source of data thereby allows the vehicle to continuously correct the location of the vehicle in difficult navigation scenarios in which accuracy is otherwise unavailable due to the urban environment. For instance, as the vehicle passes a parking meter, the location of the vehicle may be adjusted to be adjacent to the location of the parking meter being passed. By adding in the information regarding parking meters, the location error of the vehicle may be well within the accuracy of 1.5 meters mandated by NHTSA.

Figure 1:
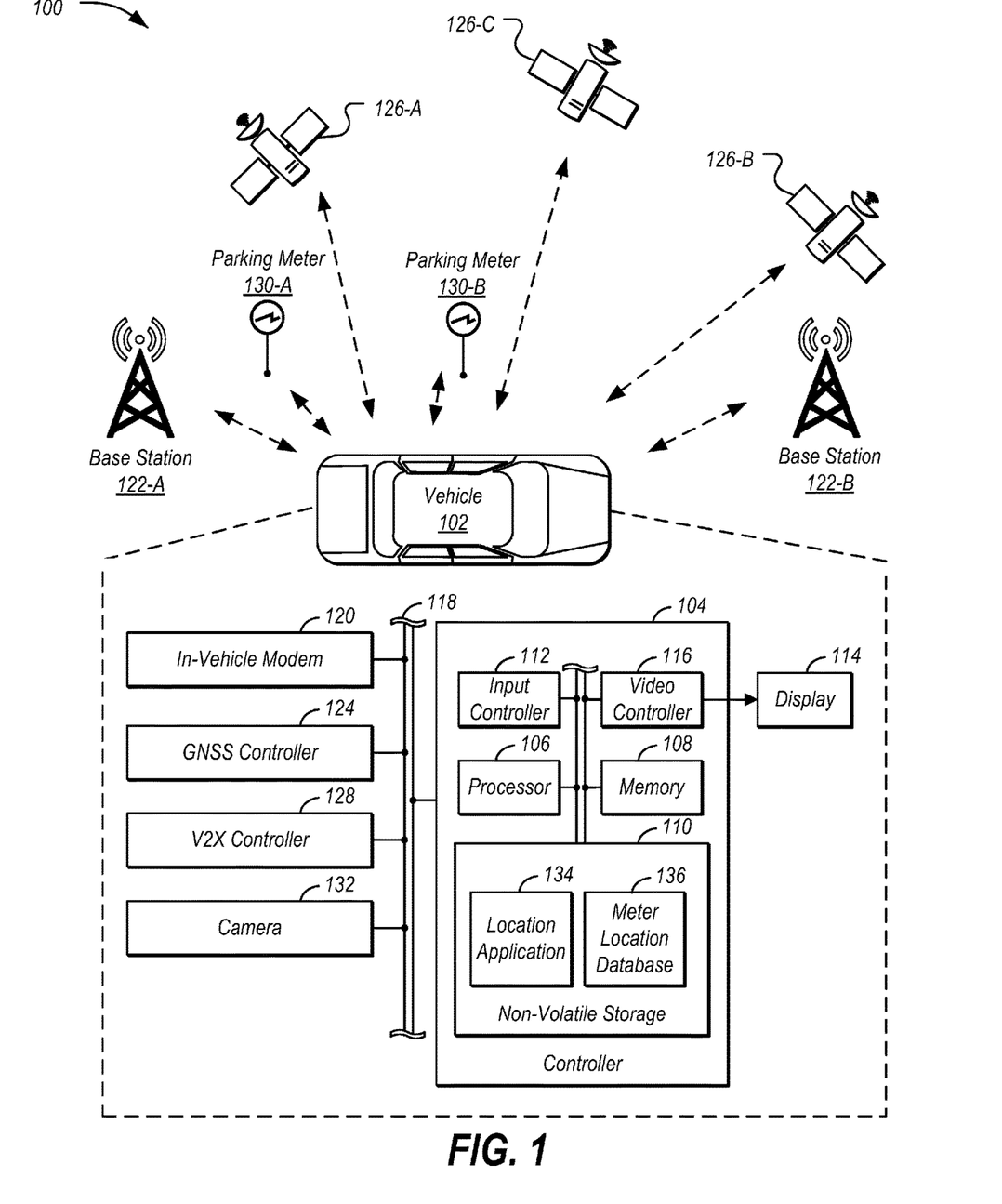
FIG. 1 illustrates an example diagram of a system configured to provide location-based services to a vehicle.

FIG. 1 illustrates an example diagram of a system 100 configured to provide location-based services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Location-based services may include telematics services such as navigation, turn-by-turn directions, and weather reports, or non-telematics services such as park assist or collision detection. It should be noted that the illustrated system 100 is merely an example, and more, fewer, and/or differently located elements may be used.

A controller 104 may include one or more processors 106 configured to perform instructions, commands and other routines in support of the processes described herein. For instance, the controller 104 may be configured to execute instructions of vehicle applications loaded to a memory 108 to provide features such as navigation, turn-by-turn directions, and park assist. Such instructions and other data may be maintained in a non-volatile manner using a variety of types of computer-readable storage medium 110. The computer-readable medium 110 (also referred to as a processor-readable medium or storage) includes any non-transitory medium (e.g., a tangible medium) that participates in providing instructions or other data that may be read by the processor 106 of the controller 104. Computer-executable instructions may be compiled or interpreted from computer programs created using a variety of programming languages and/or technologies, including, without limitation, and either alone or in combination, JAVA, C, C++, C#, OBJECTIVE C, FORTRAN, PASCAL, JAVA SCRIPT, PYTHON, PERL, AND PL/SQL.

The controller 104 may be provided with various features allowing the vehicle occupants to interface with the controller 104. For example, the controller 104 may include an input controller 112 configured to receive user input from one or more human-machine interface (HMI) controls of the vehicle 102 providing for occupant interaction with the vehicle 102. These may include one or more buttons or other HMI controls configured to invoke functions on the controller 104 (e.g., steering wheel audio buttons, a push-to-talk button, instrument panel controls, etc.). The controller 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities.

The controller 104 may be further configured to communicate with other components of the vehicle 102 via one or more in-vehicle buses 118. The in-vehicle buses 118 may include one or more of a vehicle controller area network (CAN), an Ethernet network, or a media-oriented system transfer (MOST), as some examples. The in-vehicle buses 118 may allow the controller 104 to communicate with other vehicle 102 systems. As shown, vehicle systems described in detail below may communicate with the controller 104 over an in-vehicle bus 118. In other examples, the controller 104 may be connected to more or fewer in-vehicle buses 118. For instance, the audio module and the HMI controls may communicate with the controller 104 over another in-vehicle bus separate from the illustrated vehicle bus 118. Additionally or alternately, one or more HMI controls or other components may be connected to the controller 104 via different in-vehicle buses 118 than shown, or directly without connection to an in-vehicle bus 118.

The vehicle 102 may include an in-vehicle modem 120 (which may not be present in some configurations). If so equipped, the controller 104 may use the in-vehicle modem 120 to access communications services of a communications network (not shown), such as packet-switched network services (e.g., Internet access, voice over Internet protocol (VoIP) communication services) available to devices connected to the communications network. To facilitate the communications over the communications network, the in-vehicle modem 120 may be associated with unique device identifiers (e.g., mobile device numbers (MDNs), Internet protocol (IP) addresses, etc.) to identify the communications of the in-vehicle modem 120 over the communications network. The modem 120 may communicate with one or more base stations 122 to connect to the communications network. While two base stations 122 are shown (122-A and 122-B) it should be noted that in many examples systems 100 include many more than two base stations 122.

The vehicle 102 may also include a GNSS controller 124 configured to provide current vehicle 102 location and heading information. To do so, the GNSS controller 124 may receive satellite positioning data as well as data on clock timing transmitted from multiple GNSS satellites 126 (only three GNSS satellites 126-A, 126-B, and 126-C are shown for simplicity, but a GNSS system would typically include many more). Using the satellite data, the GNSS controller 124 may precisely measure the distance from selected ones of the GNSS satellites 126 to the GNSS controller 124 antenna and therefore may compute the GNSS controller 124 position, velocity, and time parameters to a high degree of accuracy using triangulation techniques.

The vehicle 102 may additionally include a V2X controller 128 configured to wirelessly send and receive data from infrastructure. As some examples, V2X controller 128 may communicate with infrastructure over Wi-Fi or DSRC. As some other examples, the V2X controller may communicate with infrastructure via a machine-type communication network, and/or an Internet-of-things network.

Parking meters 130-A and 130-B (collectively 130) are examples of infrastructure located at fixed locations. In some examples, the parking meters 130 are smart meters capable of communicating with the vehicle 102 electronically. As some example, the parking meters 130 may be configured to communicate via the V2X controller 128 or may be connected to a cellular network via the cellular base stations 122. In other example, the parking meters 130 may lack connectivity and may not be reachable electronically. While many examples herein describe parking meters 130 located along roadways or other locations within an urban environment where parking of vehicles 102 may be desired, it should be noted that other infrastructure with known fixed locations (e.g., fixed-location devices along the roadway) and ability to be identified from the roadway may be utilized as well.

The vehicle 102 may also include various cameras 132. The cameras 132 may be configured to allow the vehicle 102 to gain information regarding obstructions, moving objects, or other aspects of the environment surrounding the vehicle 102. Moreover, the cameras 132 may be utilized to take pictures and videos of surroundings of the vehicle 102 to make driving decisions. These images and videos may include imaging of roadside parking meters, which may be identified from the images to identify the location of the parking meters, and therefore the location of the vehicle 102.

The cameras 132 may include a front-mounted camera (e.g., behind a front grill of the vehicle 102, inside the vehicle 102 at the top of the front windshield facing forwards, on a roof rack facing forwards, etc.) configured to capture image or video in front of the vehicle 102, and a rear-mounted camera (e.g., above a license plate, on a rear trunk lid, incorporated into a rear bumper, inside the vehicle facing out a rear windshield, etc.) configured to capture image or video behind the vehicle 102. It should be noted that these cameras 132 are merely exemplary, and more, fewer, and/or differently-located cameras 132 may be utilized in other examples.

A location application 134 may be an example of an application installed to the controller 104 of the vehicle 102. When execute by one or more processors of the controller 104, the location application 134 may be utilized to allow the vehicle 102 to determine an approximate location of the vehicle 102. The location application 134 may be programmed to utilize sources of location information, such as the GNSS controller 124, the modem 120, and the V2X controller 128, to determine an estimate of a current location of the vehicle 102.

The location application 134 may be further configured to utilize the cameras 132 of the vehicle 102 to provides a significantly more accurate location of the vehicle 102. Using images captured from the cameras 132, the location application 134 may identify parking meters 130 that are included within the images. The location application 134 may be further configured to identify specific parking meters 130 according to numbers or other information identified on the parking meter 130 included in the images. From these identities, the location application 134 may obtain the locations of the imaged parking meters 130. In an example, each parking meter 130 may be identified to be located at a specific latitude, longitude, and altitude. If these parking meter 130 are equipped with machine-type communication components or internet-of-things components for their monitoring, then the location application 134 may obtain the locations of these parking meters 130 wirelessly, such as via the cellular network or over an Internet-of-things network using the modem 120 or the V2X controller 128. Further aspects of the operation of the location application 134 are discussed in detail below.

It should be noted that while the location determining and location correcting functionality is described herein in many examples as being performed by the controller 104, in other examples, some or all of these operations may be performed by one or more processors of the modem 120, the GNSS controller 124, the V2X controller 128, the camera 132, or another application processor of the vehicle 102.

Figure 2:
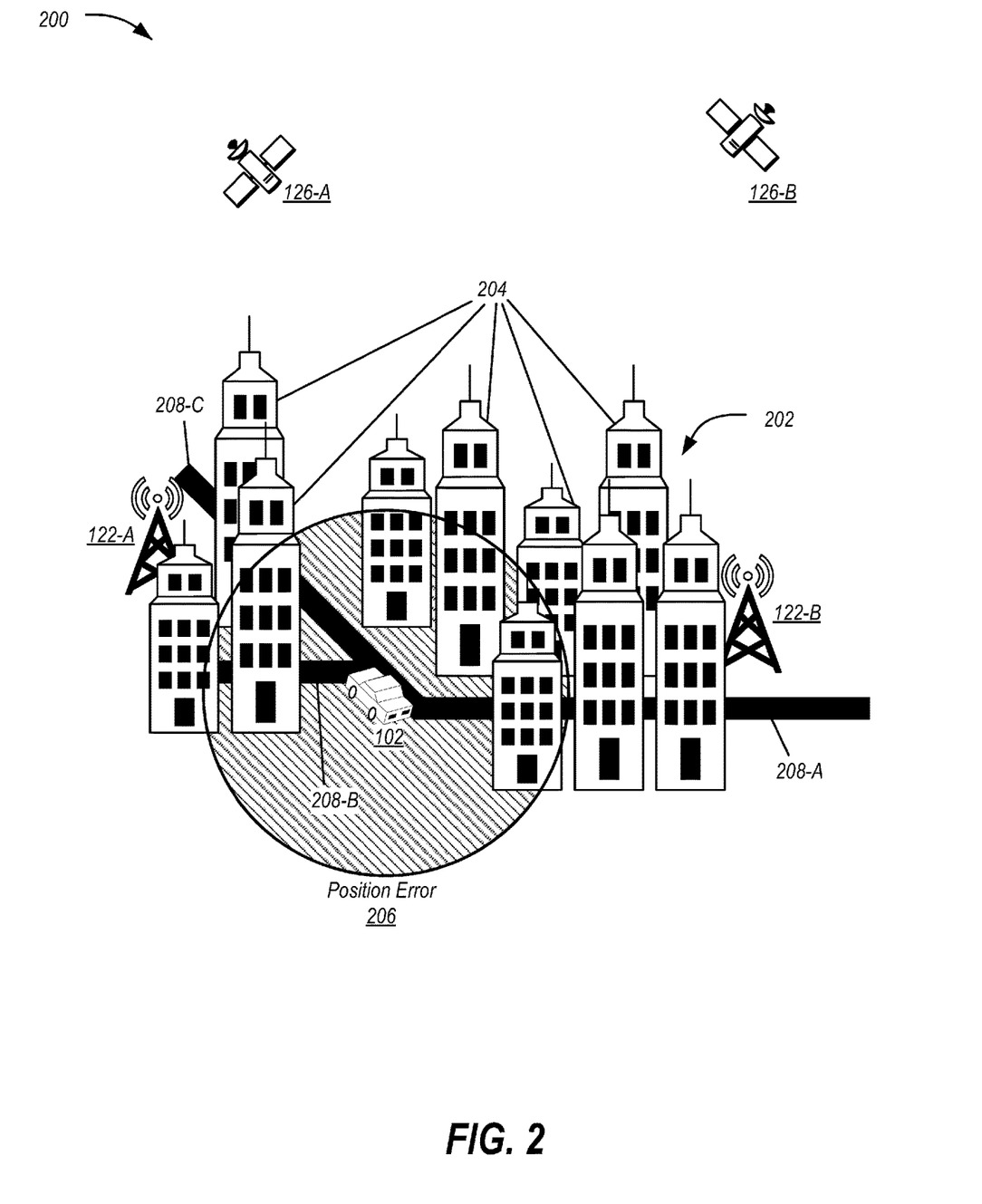
FIG. 2 illustrates an example of an urban environment having high buildings that obstruct line-of-sight view of cellular base stations and GNSS satellites to the vehicle.

FIG. 2 illustrates an example 200 of an urban environment 202 having high buildings 204 that obstruct line-of-sight view of cellular base stations 122 and GNSS satellites 126 to the vehicle 102. The signal from these transmitters may bounce off the buildings 204 causing multipath errors, which degrades the ability of the vehicle 102 to identify its location. As the accuracy of location data computed according to signals received from the cellular base stations 122 and GNSS satellites 126 depends on the quality of the available GNSS satellite 126 signals, where buildings or the landscape obstructs the line-of-sight, these signals may be insufficient to locate the vehicle 102 with accuracy.

In this non-line-of-sight situation, the vehicle 102 may experience positioning error 206, which may be significant enough to cause navigation errors and/or give incorrect commands for lane turning along a vehicle 102 route. For instance, it can be seen that the positioning error 206 is large enough that the location of the vehicle 102 may be determined to be located on any of three different roads 208-A, 208-B, 208-C included within the position error 206 uncertainty area.

Figure 3:
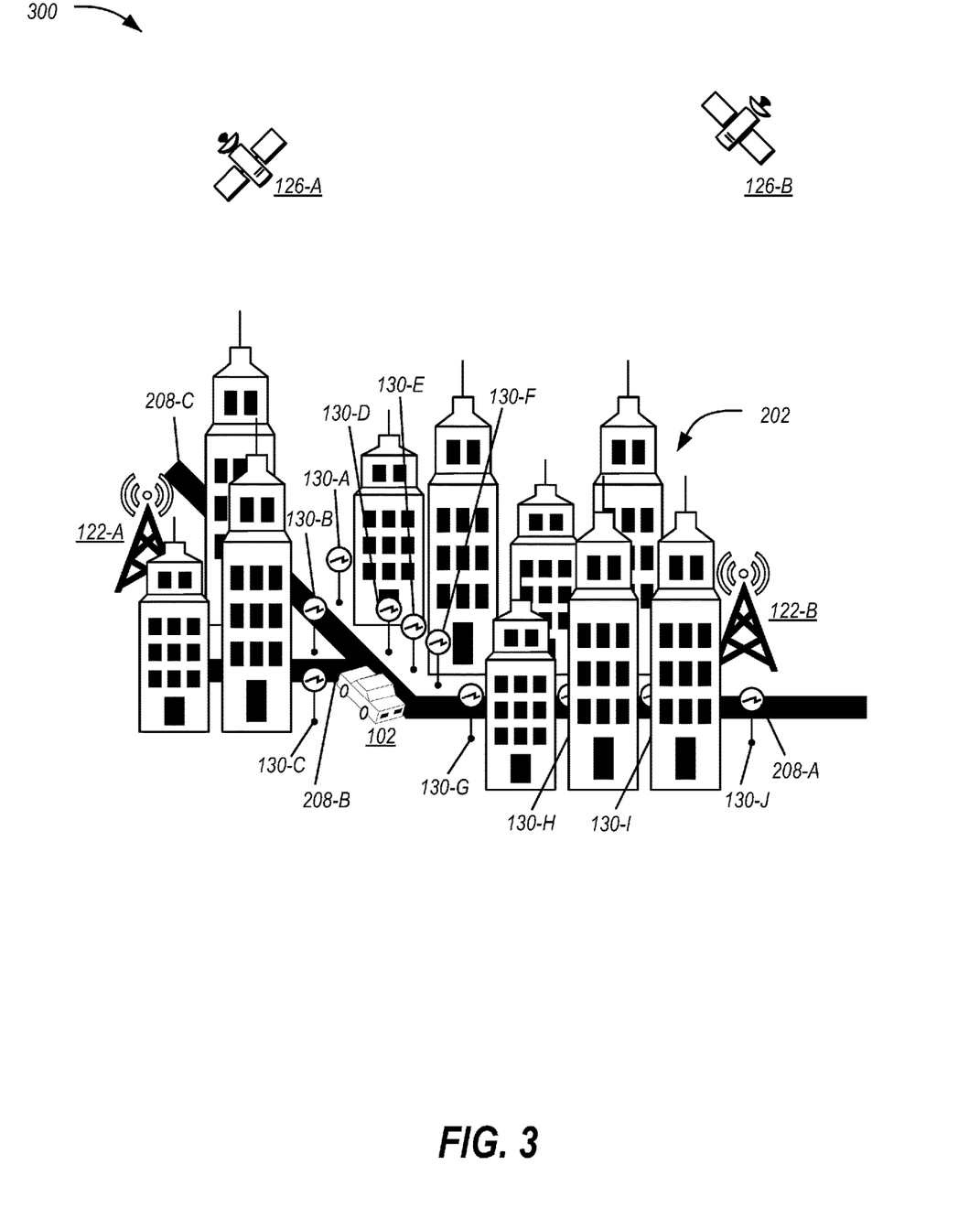
FIG. 3 illustrates an example of vehicle location error due to obstructed view of GNSS satellites in a congested urban environment.

FIG. 3 illustrates an example 300 of the urban environment 202 showing a plurality of parking meters 130 along the roadways. As the vehicle 102 traverses a route, the parking meters 130 located along the route that may be utilized to inform the location application 134 of the location and distance of the vehicle 102 from the parking meters 130. This additional source of data thereby allows the vehicle 102 to continuously correct the location of the vehicle 102 in difficult navigation scenarios in which accuracy is otherwise unavailable due to the urban environment. By adding in the information regarding the predefined fixed locations of the parking meters 130, the positioning error 206 of the vehicle 102 shown in FIG. 2 may be reduced to be within the accuracy of 1.5 meters mandated by NHTSA.

The locations of the nearby parking meters 130 may be determined by the vehicle 102 in various ways. In an example, the location application 134 may access a meter location database 136 stored to the storage 110 of the controller 104 of the vehicle 102, and may query the meter location database 136 using identifiers of the parking meters 130 to obtain corresponding locations of the parking meters 130. These locations may be in the form of latitude, longitude, and/or elevation coordinates. In another example, the V2X controller 128 may be utilized to obtain the locations of the nearby parking meters 130. For instance, the V2X controller 128 may query the parking meters 130 for the locations of the parking meters 130. In yet another example, the modem 120 of the vehicle 102 may be utilized to obtain locations of the nearby parking meters 130, such as by accessing a cloud service to receive location information for the located parking meters 130. In such an example, the vehicle 102 may query a cloud server storing a meter location database 136 for the location information.

Figure 4:
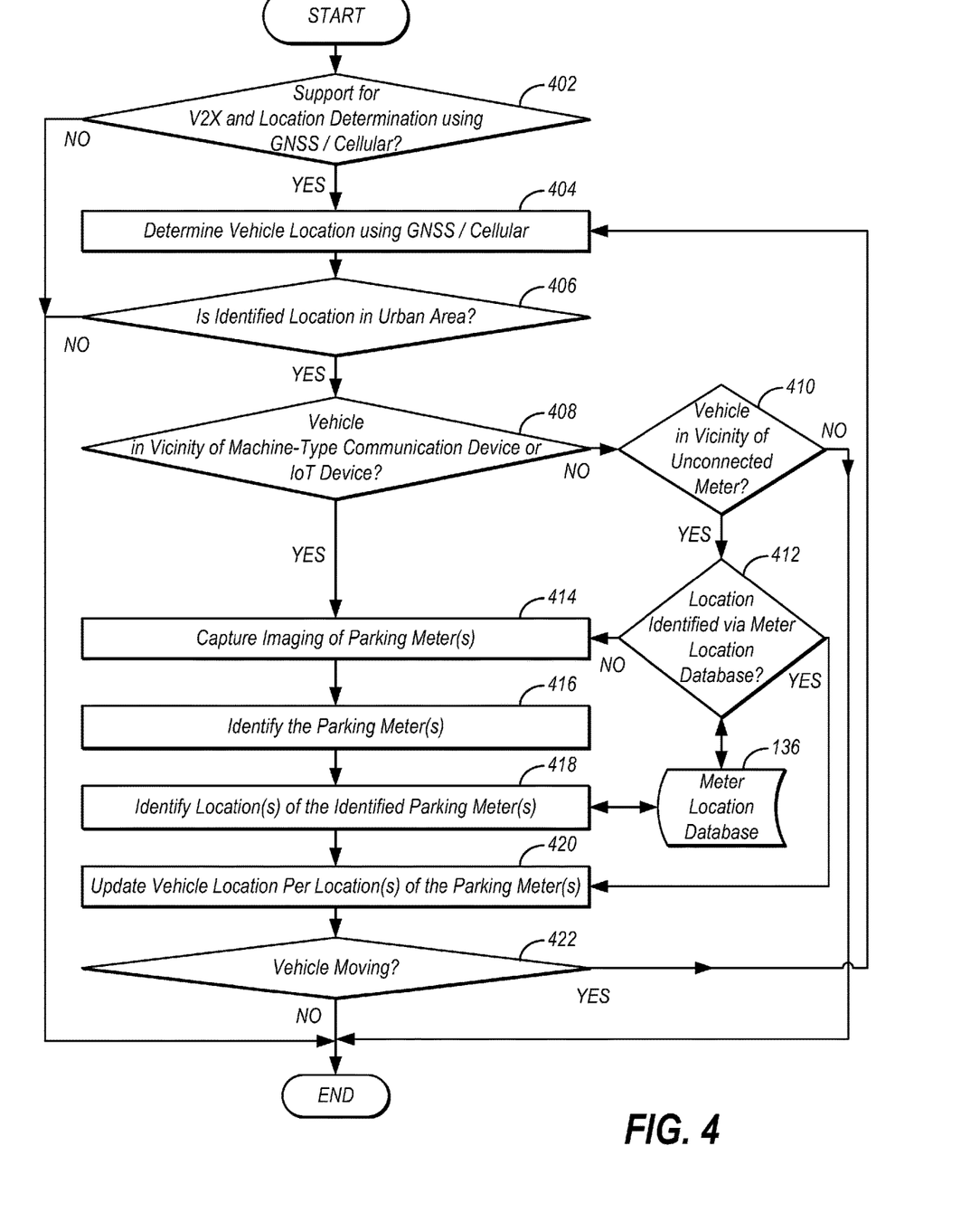
FIG. 4 illustrates an example process for determining vehicle location using location accuracy enhancements.

FIG. 4 illustrates an example process 400 for determining a location of a vehicle 102 using location accuracy enhancements. In an example, the process 400 may be performed by the vehicle 102 discussed in detail above, executing the location application 134 on the controller 104.

At 402, the vehicle 102 identifies whether the vehicle 102 supports V2X communication, as well as location determination using GNSS and/or cellular technology. In an example, the location application 134 may query to ensure that the vehicle 102 is equipped with an in-vehicle modem 120 and/or a GNSS controller 124. In another example, the location application 134 may query to ensure that the vehicle 102 is equipped with a V2X controller 128. If these controllers are not present or are non-functional, the process 400 ends. Otherwise the process continues to operation 404, at which the location application 134 utilizes the vehicle modem 120 and/or a GNSS controller 124 to determine an initial location estimate for the vehicle 102.

The vehicle 102 determines whether the location determined at operation 404 is within an urban environment 202 at operation 406. In an example, the location application 134 may compare the location determined at operation 404 with the geofences to determine whether the location is located within a geofence that is marked as urban. These geofences may be stored to the vehicle 102 as a map of locations that are urban, such as geofences of city boundaries. In another example, the geofences may be stored to a remote server and queried by the location application 134 using the modem 120. In yet a further example, the location application 134 may send the location to a remote server and may receive back an indication of whether the location is urban. In yet another example, the location application 134 may utilize the cameras 132 to capture video or still pictures and may use image recognition techniques to determine whether the location is urban. For instance, the image recognition may identify tall buildings, sidewalks, or other features indicative of an urban environment. If the location is determined to be urban, control passes to operation 408. If not, then accuracy of the location should be acceptable, and the process 400 ends.

At 408, the vehicle 102 determines whether the vehicle 102 is within the vicinity of any fixed-location parking meters 130 having communications capabilities. In an example, the location application 134 may utilize the V2X controller 128 to identify whether signals are present that appear to have come from parking meters 130, or to wirelessly query for parking meters 130 to see if any parking meters 130 respond to a query. If parking meters 130 are detected, control passes to operation 412. If not, control passes to operation 410 to identify unconnected parking meters.

At 410, the vehicle 102 determines whether the vehicle 102 is within the vicinity of any fixed-location parking meters 130 lacking communications capabilities. In an example, the location application 134 may query the meter location database 136 to determine whether any parking meters 130 are specified in the database 136 as being located within proximity to the vehicle 102. In yet a further example, the location application 134 may utilize the camera 132 to capture video or still pictures, and may use image recognition techniques to determine whether the location includes any parking meters 130.

At 412, the vehicle 102 determines whether the unconnected parking meters 130 can be identified using the meter location database 136. For instance, for parking meters 130 that lack connectivity, their locations may be looked up in the database 136 without attempting to use the modem 120 or V2X controller 128 to receive information about the parking meters 130. If the locations are available per the meter location database 136, control passes to operation 420. If not, control passes to operation 414.

At 414, the vehicle 102 captures images of the parking meters 130. In an example, the location application 134 may utilize the cameras 132 to capture video or still pictures of the parking meters 130. In some examples, these images may have been taken in the performance of other operations of the process 400, such as during operation 408.

At operation 416, the vehicle 102 identifies the parking meters 130 that appear in the captured images. In an example, the location application 134 may identify specific parking meters 130 according to numbers or other information identified on or near the parking meters 130 included in the images. It should be noted that this identification may be optional in scenarios in which the distance to the parking meter 130 is computed using vehicle sensors and without regard to which specific meter is being located.

At 418, the vehicle 102 identifies the locations of the identified parking meters 130. From these identities identified at operation 414, the location application 134 may obtain the locations of the imaged parking meters 130. In an example, the location application 134 may utilize the captured imaging in combination with other vehicle 102 sensor data such as LIDAR to determine the distance of the vehicle 102 to a particular parking meter 130.

In another example, each parking meter 130 may identify itself as being located at a specific latitude, longitude, and altitude. If these parking meters 130 are equipped with machine-type communication components or internet-of-things components for their monitoring, then the location application 134 may obtain the locations of these parking meters 130 wirelessly, such as via the cellular network using the modem 120 or over an Internet-of-things network via the V2X controller 128.

In yet another example, the location application 134 may obtain the locations of the imaged parking meters 130 by querying a cloud server hosting a meter location database 136 for the location information.

After operation 418, the process 400 continues to operation 420. Additionally, the location application 134 may also update the meter location database 136 local to the vehicle 102 to include the locations of the parking meters 130 whose locations were identified at operation 418.

At 420, the vehicle 102 updates the estimated vehicle location using the locations of the parking meters 130. In an example, using the coordinates of the locations of the parking meters 130, the location application 134 can update the location determined at operation 404. For instance, if the vehicle 102 provides imaging that shows one or more parking meters 130 along a roadway are being passed by the vehicle 102, then the location application 134 may update the location to be adjacent along the roadway to the location of the parking meters 130 being passed. As another example, if the vehicle 102 provides imaging that shows one or more parking meters 130 along a roadway in front of the vehicle 102, then the location application 134 can update the location to be before the location of the parking meters 130 that have not yet been passed. As yet another example, if the vehicle 102 provides imaging that shows one or more parking meters 130 along a roadway that are behind the vehicle 102, then the location application 134 can update the location to be after that location of the parking meters 130 that have already been passed.

At operation 422, the vehicle 102 determines whether the vehicle 102 is moving. In an example, the location application 134 utilizes the vehicle modem 120 and/or a GNSS controller 124 to determine whether the vehicle 102 location is changing. In another example, the location application 134 may receive information via the one or more in-vehicle buses 118 that indicates the vehicle 102 is moving, such as speed information for the vehicle 102. If the vehicle 102 is determined to be moving, control passes to operation 404 to determine the new vehicle 102 location. Otherwise, the process 400 ends.

Accordingly, by combining the location determined using wireless-technology sources with the approximate location of the vehicle 102 obtained using the cameras 132 in relation to roadside parking meters 130, the location application 134 of the vehicle 102 may provide a significantly more accurate location of the vehicle 102. This may be advantageous for locating the vehicle 102 with higher accuracy in non-line-of sight scenarios between the vehicle 102 and base stations 122 or GNSS satellites 126.

Computing devices described herein, such as the controller 104, generally include computer-executable instructions where the instructions may be executable by one or more computing devices such as those listed above. Computer-executable instructions, such as those of the location application 134, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a camera; and
   a processor programmed to
   determine a first location of the vehicle using wireless signals;
   capture an image along a roadway being traversed by the vehicle using the camera;
   identify a parking meter in the image;
   identify a device location of the parking meter shown in the image according to a wireless transmission received from the parking meter; and
   update the first location of the vehicle in comparison with the device location of the parking meter to generate a second location of the vehicle, thereby using the device location of the parking meter as an additional source of location data.

2. The vehicle of claim 1, wherein the wireless transmission encodes the device location of the parking meter as a latitude, longitude, and altitude of the parking meter.

3. The vehicle of claim 1, wherein the wireless transmission encodes a unique identifier of the parking meter, and the processor is further programmed to look up the unique identifier of the parking meter device in a meter location database to identify the device location.

4. The vehicle of claim 3, wherein the meter location database is stored to the vehicle.

5. The vehicle of claim 3, wherein the meter location database is stored to a server remote from the vehicle, and the processor is further programmed to utilize a modem of the vehicle to send the unique identifier of the parking meter to the server and receive the device location from the server in response.

6. The vehicle of claim 3, wherein the processor is further programmed to add the device location to the meter location database.

7. The vehicle of claim 1, wherein the processor is further programmed to:
   determine the vehicle is within an urban area by comparing the first location with geofences to determine whether the first location is located within a geofence designating an urban area, and
   capture the image of the parking meter along the roadway responsive to determining the vehicle is within the urban area.

8. The vehicle of claim 7, wherein the processor is further programmed to query the geofences from a remote server.

9. The vehicle of claim 7, wherein the processor is further programmed to send the first location to a remote server and receive back an indication of whether the first location is within an urban area.

10. The vehicle of claim 1, wherein the processor is further programmed to:
   utilize the camera to capture an image of surroundings of the vehicle, and use image recognition techniques on the image of surroundings of the vehicle to determine whether the first location is within an urban area based on identification of predefined urban features; and
   capture the image of the parking meter along the roadway responsive to determining the vehicle is within the urban area.

11. A method comprising:
   determining a location of a vehicle using one or more of global navigation satellite system (GNSS) or cellular signals; and
   updating the location of the vehicle to generate a revised location of the vehicle by using predefined fixed locations of one or more parking meters as an additional source of location data, the one or more parking meters being identified by the vehicle in images captured by a camera of the vehicle, the predefined fixed locations of the one or more parking meters being identified according to a wireless tranmission received from the one or more parking meters, the additional source of location data allowing the vehicle to correct the location of the vehicle to generate the revised location.

12. The method of claim 11, further comprising identifying unique identifiers of the parking meters from the images, and looking up locations of the parking meters in a meter location database according to the unique identifiers.

13. The method of claim 12, wherein the meter location database is stored to a server remote from the vehicle, and further comprising utilizing a modem of the vehicle to send the unique identifiers to the server and receive locations of the parking meters from the server in response.

14. The method of claim 12, further comprising:
determining that the vehicle is within an urban area by comparing the location of the vehicle with geofences to determine whether the location of the vehicle is within a geofence designated as including an urban area; and
capturing the images responsive to determining the vehicle is within the urban area.

15. The method of claim 14, further comprising querying the geofences from a remote server.

16. The method of claim 12, further comprising one or more of:
sending the location of the vehicle to a remote server and receiving back an indication of whether the location of the vehicle is within an urban area; and
capturing an image of surroundings of the vehicle, and using image recognition techniques on the image of the surroundings of the vehicle to determine whether the location of the vehicle is within an urban area based on identification of predefined urban features.

17. A non-transitory computer-readable medium including instructions that, when executed by a processor of a controller of a vehicle, cause the vehicle to:
determine a first location of the vehicle using wireless signals from one or more of global navigation satellite system (GNSS) satellites or cellular base stations;
capture an image of a parking meter using a camera of the vehicle;
identify a predefined fixed location of the parking meter included within the image according to a wireless transmission received from the parking meter; and
update the first location using the location of the parking meter to generate a second location of the vehicle.

18. The medium of claim 17, wherein the wireless transmission encodes the predefined fixed location of the parking meter as a latitude, longitude, and altitude of the parking meter.

19. The medium of claim 17, wherein the wireless transmission encodes a unique identifier of the parking meter, and the processor is further programmed to look up the unique identifier of the parking meter in a meter location database to identify the predefined fixed location.

* * * * *